United States Patent
Rawls

(10) Patent No.: US 11,344,127 B2
(45) Date of Patent: May 31, 2022

(54) ICE CHEST SEAT CUSHION

(71) Applicant: Rocky Lee Rawls, Gautier, MS (US)

(72) Inventor: Rocky Lee Rawls, Gautier, MS (US)

( * ) Notice: Subject to any disclaimer, the term of this patent is extended or adjusted under 35 U.S.C. 154(b) by 489 days.

(21) Appl. No.: 16/297,321

(22) Filed: Mar. 8, 2019

(65) Prior Publication Data

US 2019/0274432 A1 Sep. 12, 2019

Related U.S. Application Data

(63) Continuation-in-part of application No. 29/659,091, filed on Aug. 6, 2018, now Pat. No. Des. 873,309.

(60) Provisional application No. 62/640,727, filed on Mar. 9, 2018.

(51) Int. Cl.
*A47C 7/02* (2006.01)
*H02S 30/20* (2014.01)
*A47C 7/72* (2006.01)

(52) U.S. Cl.
CPC .............. *A47C 7/0213* (2018.08); *A47C 7/72* (2013.01); *H02S 30/20* (2014.12)

(58) Field of Classification Search
CPC .. F25D 2400/12; F25D 2400/38; H02S 30/20; A47C 7/021; A47C 7/0213; A47C 7/72
See application file for complete search history.

(56) References Cited

U.S. PATENT DOCUMENTS

| | | | |
|---|---|---|---|
| 8,203,237 B1* | 6/2012 | Cowles | H02S 20/30 307/150 |
| 9,585,522 B1* | 3/2017 | Brown, Sr. | B60R 9/02 |
| 2007/0240442 A1* | 10/2007 | Costanzo | F25B 27/005 62/235.1 |
| 2008/0001443 A1* | 1/2008 | Colglazier | B63B 29/04 297/129 |
| 2009/0025411 A1* | 1/2009 | Anderson | H02S 30/20 62/235.1 |
| 2014/0133138 A1 | 5/2014 | Chang | |
| 2015/0114980 A1 | 4/2015 | Grepper | |

(Continued)

FOREIGN PATENT DOCUMENTS

WO WO2011022729 A2 2/2011

OTHER PUBLICATIONS

Solar Cooler keeps drinks cold using the sun instead of ice, https://newatlas.com/solar-cooler/30567/.

*Primary Examiner* — David R Hare
*Assistant Examiner* — Amanda L Bailey

(57) ABSTRACT

A cushion for an ice chest with integrated solar panels designed to be used as an auxiliary power source. The cushion includes a first solar module, a second solar module, a cushion par, and an attachment mechanism. The first solar module and the second solar module each include a structural panel and a plurality of solar cells. The solar cells are distributed about a first surface of the structural panel. The first solar module and the second solar module are laterally and hingedly attached to each other to allow for a closed and open configuration. The cushion pad is adjacently connected to the structural panel of the second solar module, opposite the solar cells of the second solar module, to act as a seat. The attachment mechanism is adjacently mounted to the structural panel of the first solar module for attachment to a lid of the ice chest.

13 Claims, 5 Drawing Sheets

(56) References Cited

U.S. PATENT DOCUMENTS

| | | | |
|---|---|---|---|
| 2016/0048173 A1* | 2/2016 | Lyles | G06F 1/1656 |
| | | | 361/679.17 |
| 2016/0262543 A1* | 9/2016 | Currie | A47C 7/425 |
| 2017/0067682 A1* | 3/2017 | Spinks | H02S 20/30 |
| 2018/0141718 A1* | 5/2018 | Ahlstrom | B65D 25/2841 |

* cited by examiner

ICE CHEST SEAT CUSHION

The current application claims a priority to the U.S. Provisional Patent application Ser. No. 62/640,727 filed on Mar. 9, 2018.

FIELD OF THE INVENTION

The present invention relates generally to portable ice chest accessories. More specifically, the present invention is a seat cushion for ice chests with integrated solar panels and battery storage sources.

BACKGROUND OF THE INVENTION

Ice chests/coolers are essential accessories for outdoor activities. Whether one is going out camping or fishing on a sunny day, ice chests are always useful to carry cold drinks or perishables which are sensible to extreme temperatures. In general, ice chests/coolers comprise a base with a storage space within and a lid to enclose and protect the items stored within. The body of the ice chest/cooler is often made from insulating material to maintain the enclosed materials at a certain temperature. Newer ice chests/coolers further comprise a cooling mechanism to maintain stored items at preconfigured conditions. Now, due to the increasing use of electronics, there is always a need for auxiliary power sources. Users often find themselves looking for a power source in order to charge their electronic devices, specially while performing outdoor activities. Likewise, the ice chests/coolers which utilize a cooling mechanism often need a power source to operate. A common solution for users is to bring power replacements such as extra batteries or a power bank in order to recharge the electronic/electrical devices. However, bringing power replacements/backups often take space and are uncomfortable to carry around. Due to the different types of power connectors utilized to connect the device to the auxiliary power source, several different power sources are required, such as a battery for the ice chest/cooler and a power bank for a smart phone. Thus, a power source which is integrated within an ice chest/cooler component which can be utilized with different devices as well as generate and store power from solar power is beneficial and necessary.

Another objective of the present invention is to provide an ice chest seat cushion with a battery pack built into it. Another objective of the present invention is to provide an ice chest seat cushion which further provide a plurality of solar panels to generate power which can be stored in the battery packs. Another objective of the present invention is to provide an ice chest seat cushion which further provides a plurality of connectors which allow various devices to be plugged into in order to be charged. Another objective of the present invention is to provide an ice chest seat cushion which further comprises a mechanism to power up the cooling mechanism of an ice chest/cooler. Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

SUMMARY OF THE INVENTION

The present invention is an ice chest seat cushion with integrated battery packs. The ice chest seat cushion comprises a structure with a cushioning top connected to a bottom base which is connected to the body of an ice chest/cooler. The ice chest seat cushion further comprises a plurality of solar panels which allow the user to generate and store power in the integrated battery packs. The ice chest seat cushion further comprises a plurality of connectors including, but not limited to, Universal Serial Bus (USB) connectors and 12-Volt female connectors. The ice chest seat cushion can further be used to power up the cooling mechanism of the ice chest/cooler on which the ice chest seat cushion is installed. The ice chest seat cushion can further comprise additional storage compartments and/or receptacles for the user to store/place various items.

DETAIL DESCRIPTIONS OF THE INVENTION

All illustrations of the drawings are for the purpose of describing selected versions of the present invention and are not intended to limit the scope of the present invention.

The present invention is a seat cushion for an ice chest. The present invention is designed to attach to a lid of an ice chest to be used as a seat for a user and a power source. Specifically, the present invention allows the user(s) to power a cooling mechanism of the ice chest while also functioning as an auxiliary power source to charge external electronic devices such as cellphones and laptops.

Figure 1:
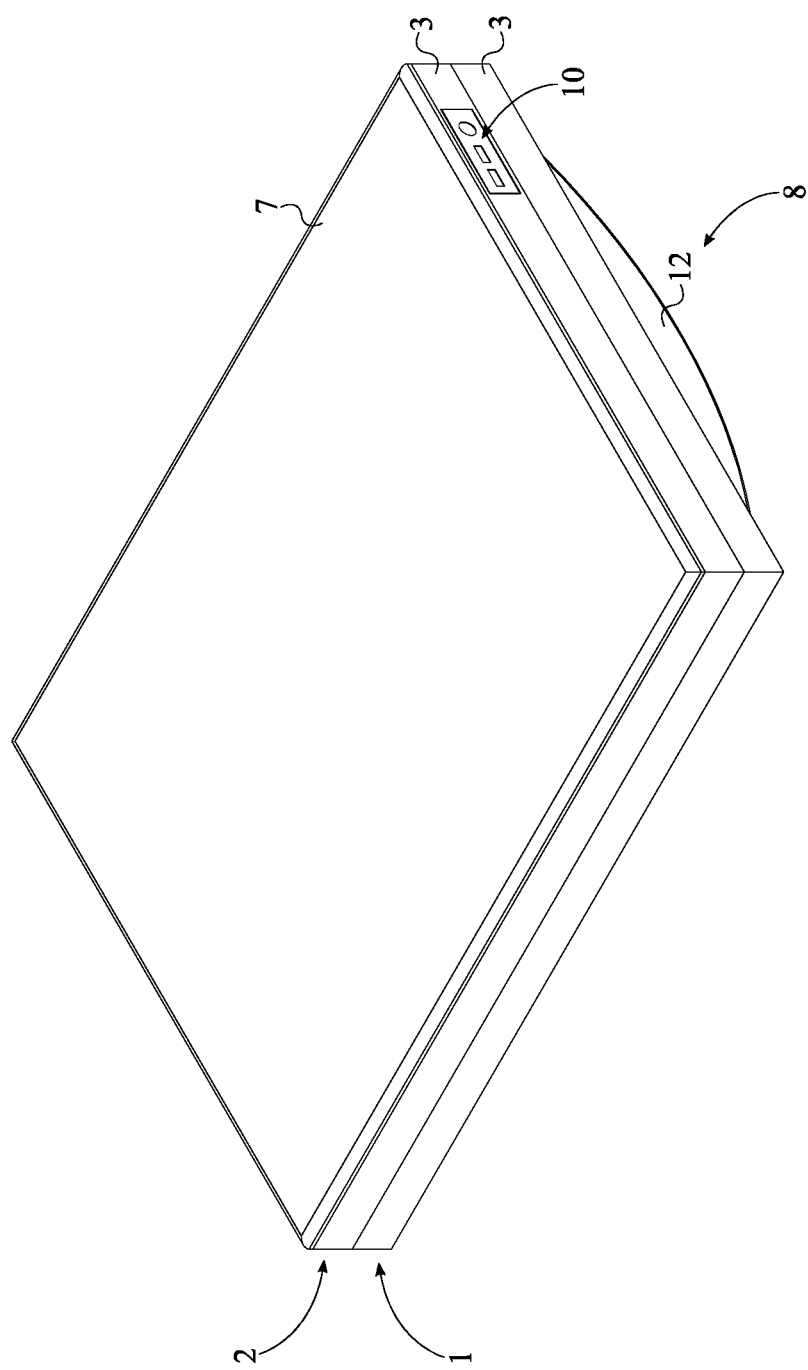
FIG. 1 is a perspective view of the present invention in a closed configuration.
Figure 2:
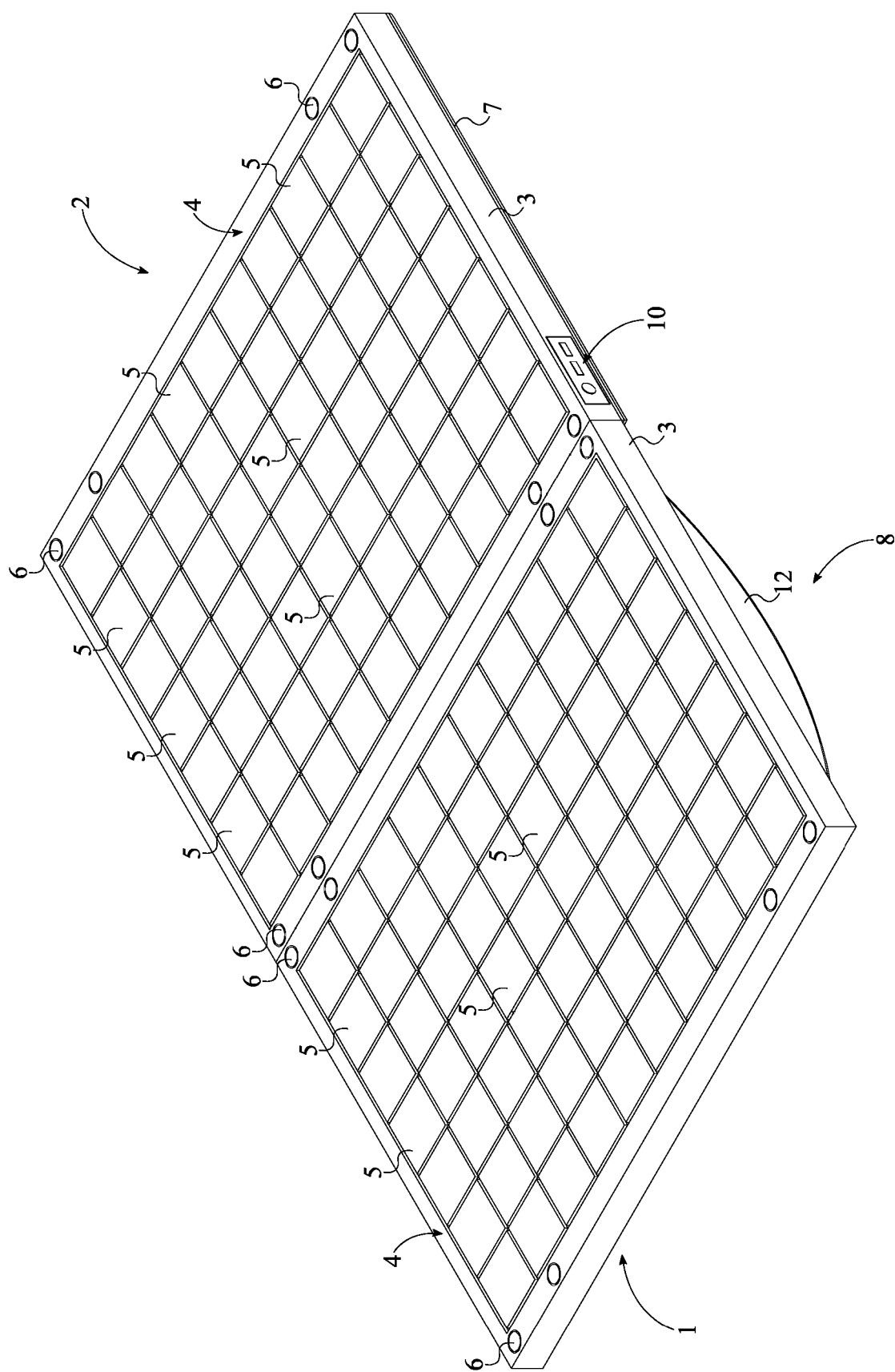
FIG. 2 is a perspective view of the present invention in an open configuration.

Referring to FIG. 1 and FIG. 2, the present invention comprises a first solar module 1, a second solar module 2, a cushion pad 7, an attachment mechanism 8, a control panel 9, an at least one power outlet port 10, and an at least one rechargeable battery 11. The first solar module 1 and the second solar module 2 make up a portion of the structural body of the present invention as well absorb and store sunlight energy as electricity. The first solar module 1 and the second solar module 2 each comprise a structural panel 3 and a plurality of solar cells 5. The structural panel 3 is an elongated plate that houses, protects, and supports the plurality of solar cells 5. The plurality of solar cells 5 physically absorbs sunlight energy and convert said energy into electricity. The plurality of solar cells 5 is distributed about a first surface 4 of the structural panel 3 with each of the plurality of solar cells 5 being adjacently integrated into the structural panel 3 as seen in FIG. 2, similar to standard solar panel designs. The first solar module 1 physically sits and attaches to the lid of the ice chest, specifically though the attachment mechanism 8. The second solar module 2 supports the cushion pad 7. The first solar module 1 and the second solar module 2 are hingedly attached to each other to allow for the present invention to be positioned into a closed configuration and an open configuration. Specifically, the first solar module 1 is positioned adjacent to the second solar module 2; wherein the plurality of solar cells 5 of the first solar module 1 and the plurality of solar cells 5 of the second solar module 2 are oriented towards each other. The structural panel 3 of the first solar module 1 and the structural panel 3 of the second solar module 2 are laterally and hingedly attached to each other, similar to two halves of a book. Resultantly, the plurality of solar cells 5 of the first solar module 1 and the plurality of solar cells 5 are hidden and protected when the present invention is positioned into the closed configuration.

The cushion pad 7 is a soft padded seat that allows the user to sit and rest on the ice chest. The cushion pad 7 is sized complimentary to the overall size of the structural panel 3 to provide the user adequate surface to sit on. The cushion pad 7 is positioned adjacent to the structural panel 3 of the second solar module 2, opposite the plurality of solar cells 5 of the second solar module 2. Additionally, the cushion pad 7 is connected adjacent and parallel to the structural panel 3 of the second solar module 2.

The attachment mechanism 8 attaches the first solar module 1 to the lid of the ice chest. Thus, the attachment mechanism 8 is positioned adjacent to the structural panel 3 of the first solar module 1, opposite the plurality of solar cells 5 of the first solar module 1. Additionally, the attachment mechanism 8 is adjacently mounted to the structural panel 3 of the first solar module 1. A variety of mechanisms may be used as the attachment mechanism 8 including, but not limited to, snaps, magnets, hook-and-loop fasteners, screw, bolts, and other standard means.

Figure 4:
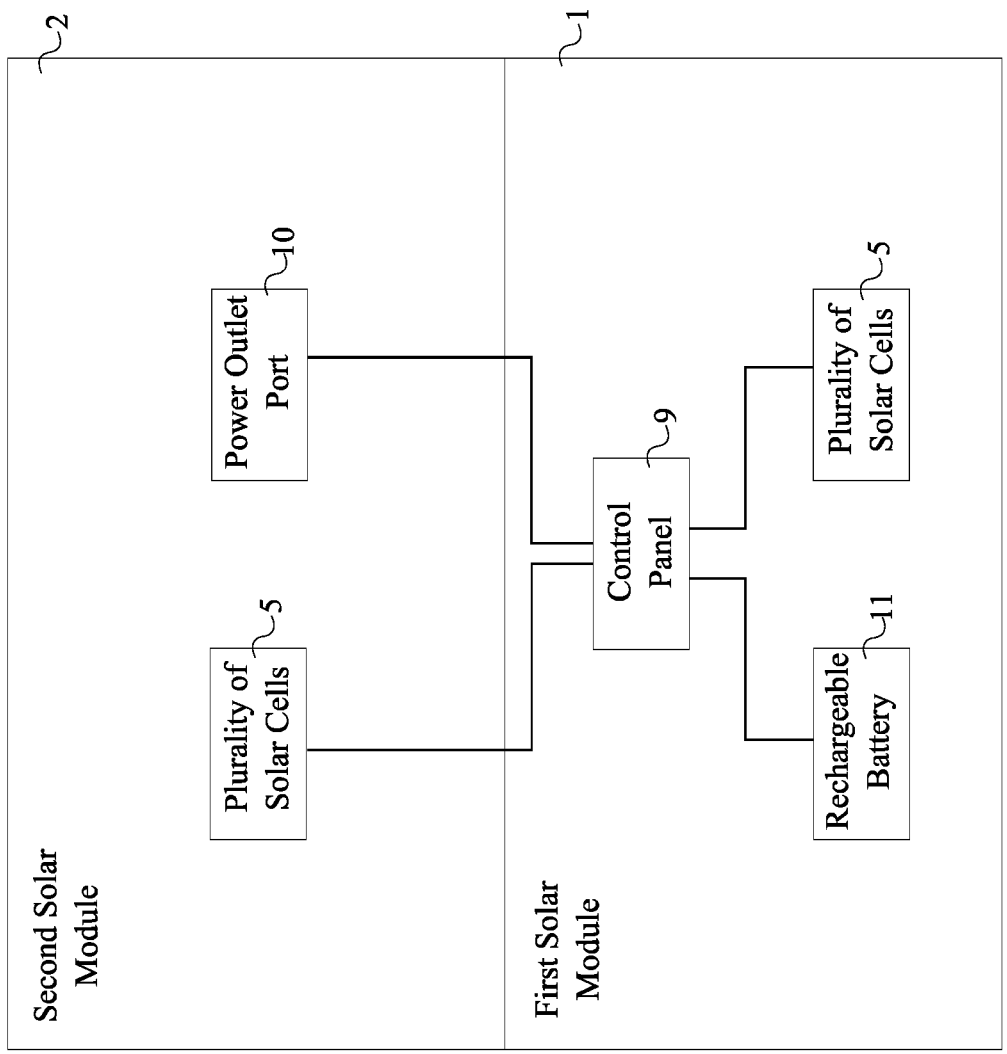
FIG. 4 is an electric schematic of the present invention.

Referring to FIG. 4, the control panel 9, the rechargeable battery 11, and the power outlet port 10 manage the electrical energy received by the first solar module 1 and the second solar module 2. The rechargeable battery 11 stores the electrical energy. The rechargeable battery 11 is internally integrated into the structural panel 3 of the first solar module 1. In the preferred embodiment of the present invention, the at least one rechargeable battery 11 includes three batteries; although the number of, size, type, and location of the rechargeable batterie(s) is subject to change to meet the needs and preferences of the user.

Figure 3:
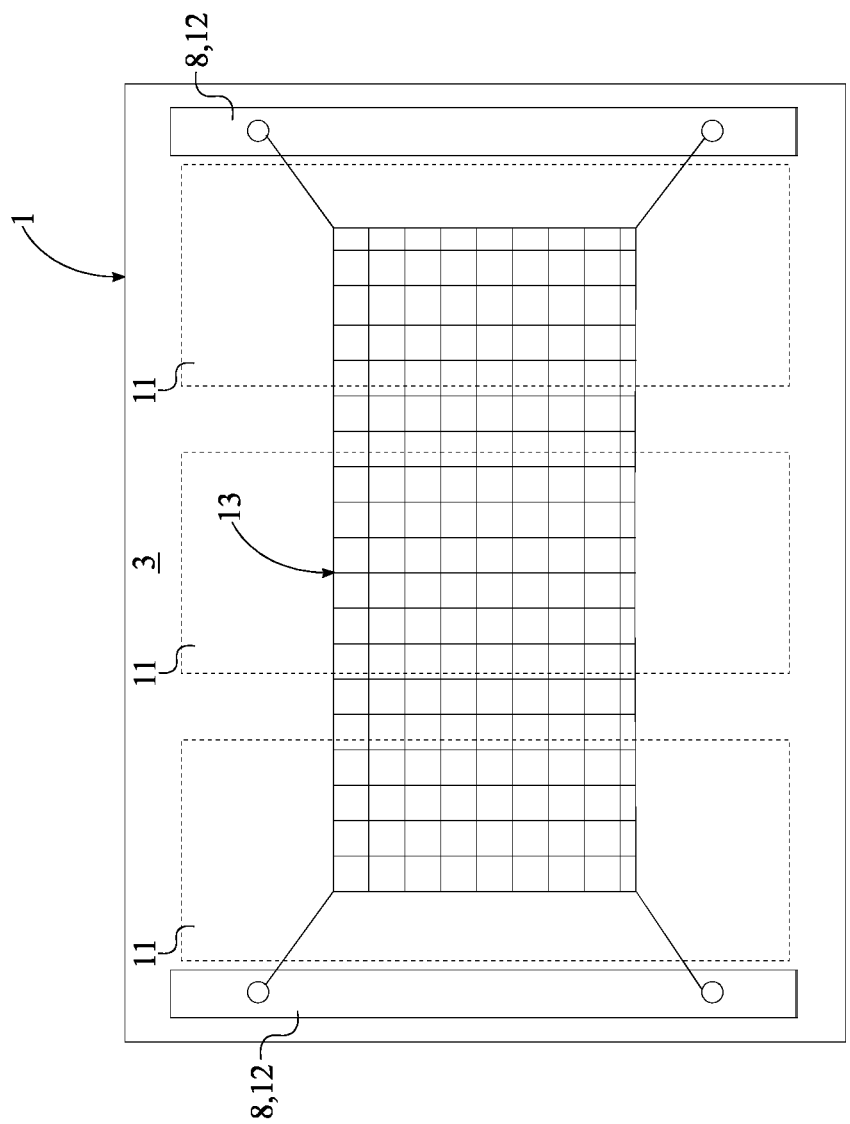
FIG. 3 is a bottom plan view of the present invention.

The control panel 9 regulates the electrical energy being transferred to the rechargeable battery 11 and the power outlet port 10 to prevent damage to the electrical components of the present invention, thus increasing the longevity of the present invention. The control panel 9 is integrated into the structural panel 3 of the first solar module 1. The power outlet port 10 allows external devices to connect to the present invention in order to receive an electrical charge. The power outlet port 10 is laterally integrated into the structural panel 3 of the second solar module 2 for easy access. Referring to FIG. 3, for the aforementioned functions, the control panel 9 is electrically connected to the plurality of solar cells 5 of the first solar module 1, the plurality of solar cells 5 of the second solar module 2, the power outlet port 10, and the rechargeable battery 11.

Referring to FIG. 2, the present invention may be configured into the open configuration, specifically the first solar module 1 and the second solar module 2 may be positioned into the open configuration. In the open configuration, the plurality of solar cells 5 from the first solar module 1 and the plurality of solar cells 5 from the second solar module 2 are exposed to sunlight in order to convert sunlight energy into electrical energy. Specifically, the structural panel 3 of the first solar module 1 and the structural panel 3 of the second solar module 2 are positioned at first obtuse angle with each other. To position the present invention into the open configuration, the user simply pulls upwards on the second solar module 2 until the plurality of solar cells 5 of the first solar module 1 and the plurality of solar cells 5 of the second solar module 2 are exposed.

Referring to FIG. 1, the present invention may be configurated into the closed configuration to act as a seat for the user, specifically the first solar module 1 and the second solar module 2 may be positioned into the closed configuration. In the closed configuration, the user may use the present invention as a means of sitting on the ice chest comfortably, i.e. sitting on the cushion pad 7. The structural panel 3 of the first solar module 1 is positioned adjacent and parallel to the structural panel 3 of the second solar module 2. Specifically, the first surface 4 of the first solar module 1 is positioned adjacent and parallel to the first surface 4 of the second solar module 2. In this configuration, the cushion pad 7 is positioned above the lid of the ice chest. This allows the ice chest to support the weight of the user as the user rests on the cushion pad 7.

Referring to FIG. 2, to prevent the present invention from unintentionally opening from the closed configuration, the first solar module 1 and the second solar module 2 each further comprises a plurality of first magnets 6. The plurality of first magnets 6 is positioned adjacent to the first surface 4 of the structural panel 3. Specifically, so as not to interfere with the plurality of solar cells 5, the plurality of first magnets 6 is perimetrically distributed about the plurality of solar cells 5. Additionally, each of the plurality of first magnets 6 being adjacently connected to the first surface 4. The size, location, number, and type of the plurality of first magnets 6 is subject to change. When the present invention is positioned in the closed configuration, each of the plurality of first magnets 6 from the first solar module 1 is magnetically attached to a corresponding magnet of the plurality of first magnets 6 from the second solar module 2. Resultantly, the first solar module 1 is attached to the second solar module 2.

Referring to FIG. 3, in one embodiment of the present invention, the attachment mechanism 8 comprises a pair of straps 12. Each of the pair of straps 12 is an elongated strip of leather, cloth, or other flexible material. The pair of straps 12 wrap around the lid of the ice chest in order to attach the present invention to the ice chest while also not limiting the overall mobility of the lid. The pair of straps 12 is positioned adjacent to the structural panel 3 of the first solar module 1, opposite the plurality of solar cells 5 of the first of the first solar module 1. Additionally, the pair of straps 12 are distributed along the structural panel 3 of the first solar module 1. In alternative embodiments of the present invention, a plurality of straps may be used to further secure the present invention to the lid of the ice chest. Each of the pair of straps 12 is terminally tethered to the structural panel 3 of the first solar module 1; specifically, each of the pair of straps 12 spans across the structural panel 3 of the first solar module 1. Each of the pair of straps 12 may be implemented as an adjustable strap to allow the present invention to attach to ice chests of different size.

Referring to FIG. 3, the present invention may further comprise a mesh pouch 13. The mesh pouch 13 provides the user with a means of containing items within the ice chest, not submerged in ice or the bottom of the ice chest. The mesh pouch 13 is positioned in between the pair of straps 12. Additionally, the mesh pouch 13 is magnetically coupled in between the pair of straps 12. In alternative embodiments of the present invention, the mesh pouch 13 may be connected and or attached to the pair of straps 12 through other fastening means. The mesh pouch 13 may include a locking mechanism, wherein the locking mechanism prevents items from falling from the mesh pouch 13. The locking mechanism may be a zipper, or a number of snaps positioned on the opening of the mesh pouch 13.

Figure 5:
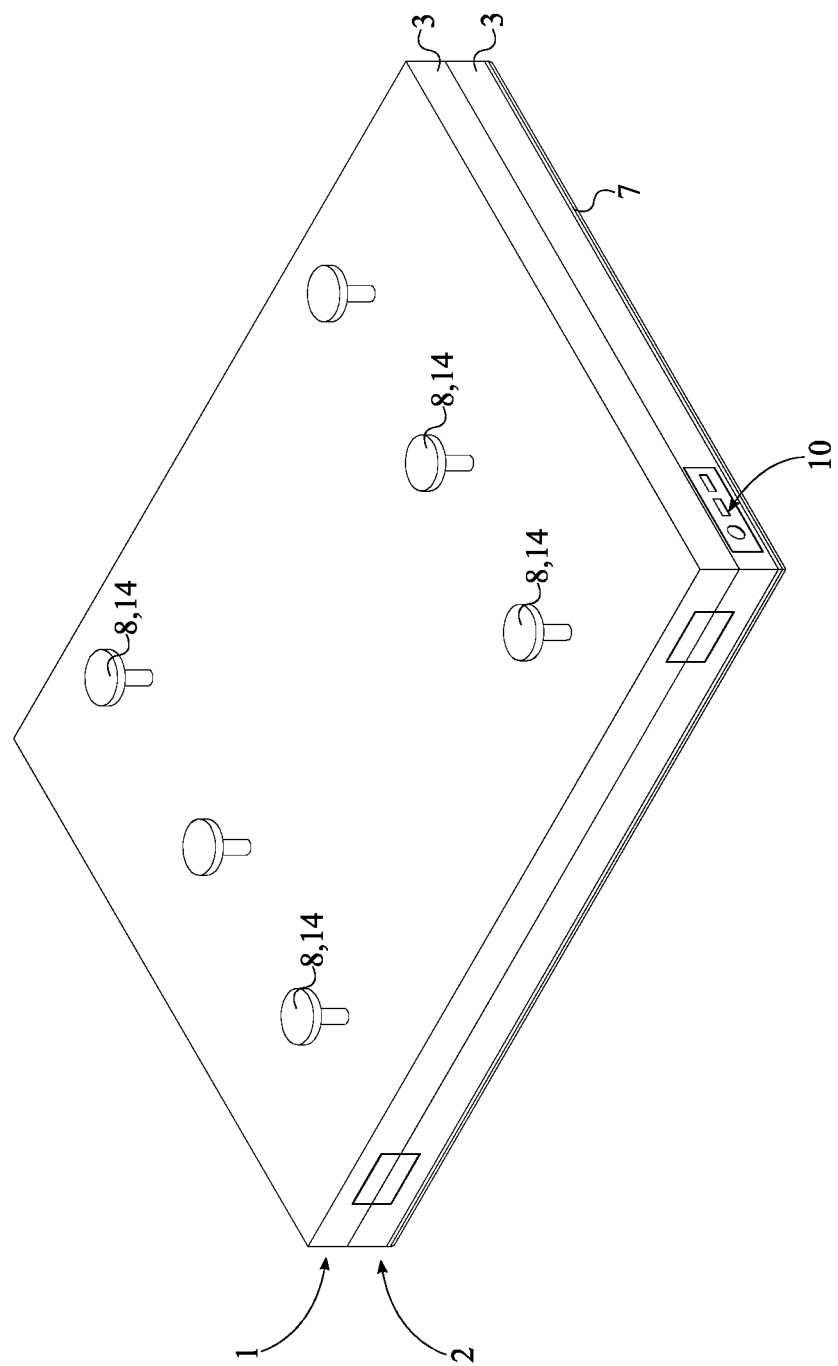
FIG. 5 is a bottom perspective view of an alternative embodiment of the present invention.

Referring to FIG. 5, in another embodiment of the present invention, the attachment mechanism 8 comprises a plurality of interlocking elements 14 that couples to complimentary interlocking elements on the top of lid. In one embodiment, each of the plurality of interlocking elements 14 is a T-shaped protrusion designed to slide and interlock with standard T-slot rails. The plurality of interlocking elements 14 is positioned adjacent to the structural panel 3 of the first solar module 1, opposite the plurality of solar cells 5 of the first solar module 1. Additionally, each of the plurality of interlocking elements 14 is adjacently connected to the structural panel 3 of the first solar module 1.

Although the invention has been explained in relation to its preferred embodiment, it is to be understood that many other possible modifications and variations can be made without departing from the spirit and scope of the invention as hereinafter claimed.

What is claimed is:

1. An ice chest seat cushion comprising:
a first solar module;
a second solar module;
a cushion pad;
an attachment mechanism configured to couple the ice chest seat cushion to an ice chest lid;
the first solar module and the second solar module each comprise a structural panel and a plurality of solar cells;
the attachment mechanism comprises a pair of straps;
the plurality of solar cells being distributed about a first surface of the of the structural panel;
each of the plurality of solar cells being adjacently integrated into the structural panel;
the first solar module being positioned adjacent to the second solar module;
the plurality of solar cells of the first solar module and the plurality of solar cells of the second solar module being oriented towards each other;
the structural panel of the first solar module and the structural panel of the second solar module being laterally and hingedly attached to each other;
the cushion pad being positioned adjacent to the structural panel of the second solar module, opposite the plurality of solar cells of the second solar module;
the cushion pad being connected adjacent and parallel to the structural panel of the second solar module;
the attachment mechanism being positioned adjacent to the structural panel of the first solar module, opposite the plurality of solar cells of the first solar module;
the attachment mechanism being adjacently mounted to the structural panel of the first solar module;
the pair of straps being positioned adjacent to the structural panel of the first solar module, opposite the plurality of solar cells of the first solar module;
the pair of straps being distributed along the structural panel of the first solar module; and
each of the pair of straps being terminally tethered to the structural panel of the first solar module.

2. The ice chest seat cushion as claimed in claim 1 comprising:
a control panel;
an at least one power outlet port;
the control panel being integrated into the structural panel of the first solar module;
the power outlet being laterally integrated into the structural panel of the second solar module; and
the control panel being electrically connected to the plurality of solar cells of the first solar module, the plurality of solar cells of the second solar module, and the power outlet port.

3. The ice chest seat cushion as claimed in claim 2 comprising:
an at least one rechargeable battery;
the rechargeable battery being internally integrated into the structural panel of the first solar module; and
the control panel being electrically connected to the rechargeable battery.

4. The ice chest seat cushion as claimed in claim 1 comprising:
wherein the first solar module and the second solar module are configured into a closed configuration;
the structural panel of the first solar module being positioned adjacent and parallel to the structural panel of the second solar module; and
the first surface of the first solar module being positioned adjacent and parallel to the first surface of the second solar module.

5. The ice chest seat cushion as claimed in claim 4 comprising:
the first solar module and the second solar module each further comprises a plurality of first magnets;
the plurality of first magnets being positioned adjacent to the first surface of the structural panel;
the plurality of first magnets being perimetrically distributed about the plurality of solar cells;
each of the plurality of first magnets being adjacently connected to the first surface; and
each of the plurality of first magnets from the first solar module being magnetically attached to a corresponding magnet of the plurality of first magnets from the second solar module.

6. The ice chest seat cushion as claimed in claim 1 comprising:
wherein the first solar module and the second solar module are configured into an open configuration; and
the structural panel of the first solar module and the structural panel of the second solar module being positioned at a first obtuse angle with each other.

7. The ice chest seat cushion as claimed in claim 1 comprising:
a mesh pouch;
the mesh pouch being positioned in between the pair of straps; and
the mesh pouch being magnetically coupled in between the pair of straps.

8. An ice chest seat cushion comprising:
a first solar module;
a second solar module;
a cushion pad;
an attachment mechanism configured to couple the ice chest seat cushion to an ice chest lid;
the first solar module and the second solar module each comprise a structural panel and a plurality of solar cells;
the attachment mechanism comprises a pair of straps;
the plurality of solar cells being distributed about a first surface of the of the structural panel;
each of the plurality of solar cells being adjacently integrated into the structural panel;

the first solar module being positioned adjacent to the second solar module;

the plurality of solar cells of the first solar module and the plurality of solar cells of the second solar module being oriented towards each other;

the structural panel of the first solar module and the structural panel of the second solar module being laterally and hingedly attached to each other;

the cushion pad being positioned adjacent to the structural panel of the second solar module, opposite the plurality of solar cells of the second solar module;

the cushion pad being connected adjacent and parallel to the structural panel of the second solar module;

the attachment mechanism being positioned adjacent to the structural panel of the first solar module, opposite the plurality of solar cells of the first solar module;

the attachment mechanism being adjacently mounted to the structural panel of the first solar module;

a control panel;

an at least one power outlet port;

the control panel being integrated into the structural panel of the first solar module;

the power outlet being laterally integrated into the structural panel of the second solar module;

the control panel being electrically connected to the plurality of solar cells of the first solar module, the plurality of solar cells of the second solar module, and the power outlet port;

the pair of straps being positioned adjacent to the structural panel of the first solar module, opposite the plurality of solar cells of the first solar module;

the pair of straps being distributed along the structural panel of the first solar module; and each of the pair of straps being terminally tethered to the structural panel of the first solar module.

9. The ice chest seat cushion as claimed in claim 8 comprising:

an at least one rechargeable battery;

the rechargeable battery being internally integrated into the structural panel of the first solar module; and the control panel being electrically connected to the rechargeable battery.

10. The ice chest seat cushion as claimed in claim 8 comprising:

the first solar module and the second solar module being configured into a closed configuration;

the structural panel of the first solar module being positioned adjacent and parallel to the structural panel of the second solar module; and the first surface of the first solar module being positioned adjacent and parallel to the first surface of the second solar module.

11. The ice chest seat cushion as claimed in claim 10 comprising:

the first solar module and the second solar module each further comprises a plurality of first magnets;

the plurality of first magnets being positioned adjacent to the first surface of the structural panel;

the plurality of first magnets being perimetrically distributed about the plurality of solar cells;

each of the plurality of first magnets being adjacently connected to the first surface; and each of the plurality of first magnets from the first solar module being magnetically attached to a corresponding magnet of the plurality of first magnets from the second solar module.

12. The ice chest seat cushion as claimed in claim 8 comprising:

wherein the first solar module and the second solar module are configured into an open configuration; and the structural panel of the first solar module and the structural panel of the second solar module being positioned at a first obtuse angle with each other.

13. The ice chest seat cushion as claimed in claim 8 comprising:

a mesh pouch;

the mesh pouch being positioned in between the pair of straps; and the mesh pouch being magnetically coupled in between the pair of straps.

* * * * *